United States Patent [19]

Nagano

[11] Patent Number: 4,619,633
[45] Date of Patent: Oct. 28, 1986

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 747,222
[22] Filed: Jun. 21, 1985
[30] Foreign Application Priority Data
  Jun. 28, 1984 [JP] Japan ................. 59-134936
[51] Int. Cl.[4] ............................................. F16H 9/00
[52] U.S. Cl. ...................................... 474/82; 474/80
[58] Field of Search .................................... 474/80, 82
[56] References Cited
U.S. PATENT DOCUMENTS
  4,437,848  3/1984  Shimano ......................... 474/82

Primary Examiner—James A. Leppink
Assistant Examiner—Frank McKenzie
Attorney, Agent, or Firm—Stevens, Davis, Miller & Mosher

[57] ABSTRACT

A bicycle derailleur which includes a linkage mechanism formed of a base member, two linkage members and a movable member carrying a chain guide. A swingable member is pivotally supported to one of two opposite members of the linkage mechanism. A return spring is supported to the other of these two opposite members and a first leg of the return spring is retained to the swingable member, while a second leg thereof is retained to the other of the aforesaid two opposite members of the linkage mechanism. A control wire is pulled to move the movable member in a forward direction with respect to the base member and the return spring restores the movable member to a rest position, thereby changing the bicycle speed. A variation in an angle of torsion of the spring is reduced with respect to a variation in the forward stroke of the movable member, whereby operating forces at the top gear side and the low gear side of the multistage gear assembly are substantially equalized to each other.

6 Claims, 7 Drawing Figures

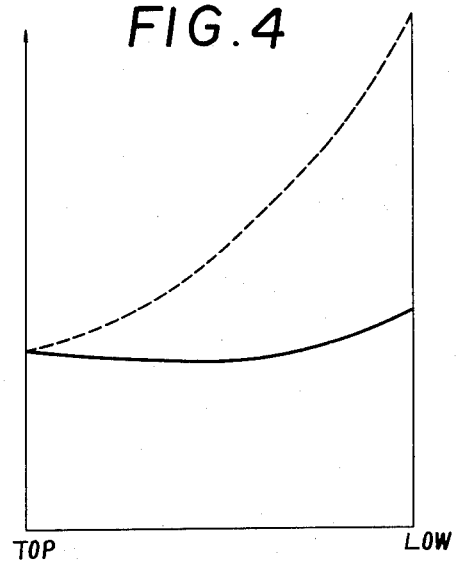
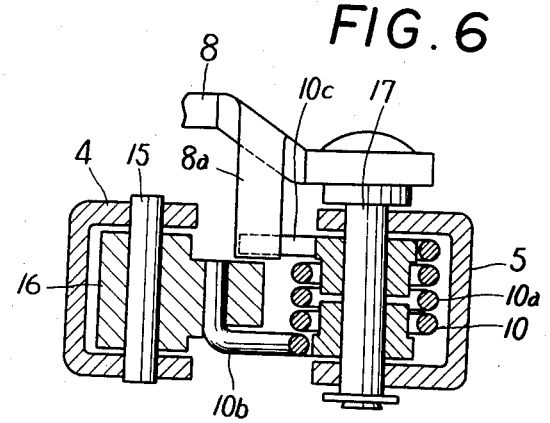
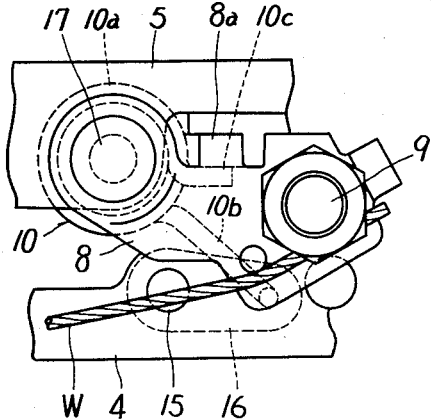
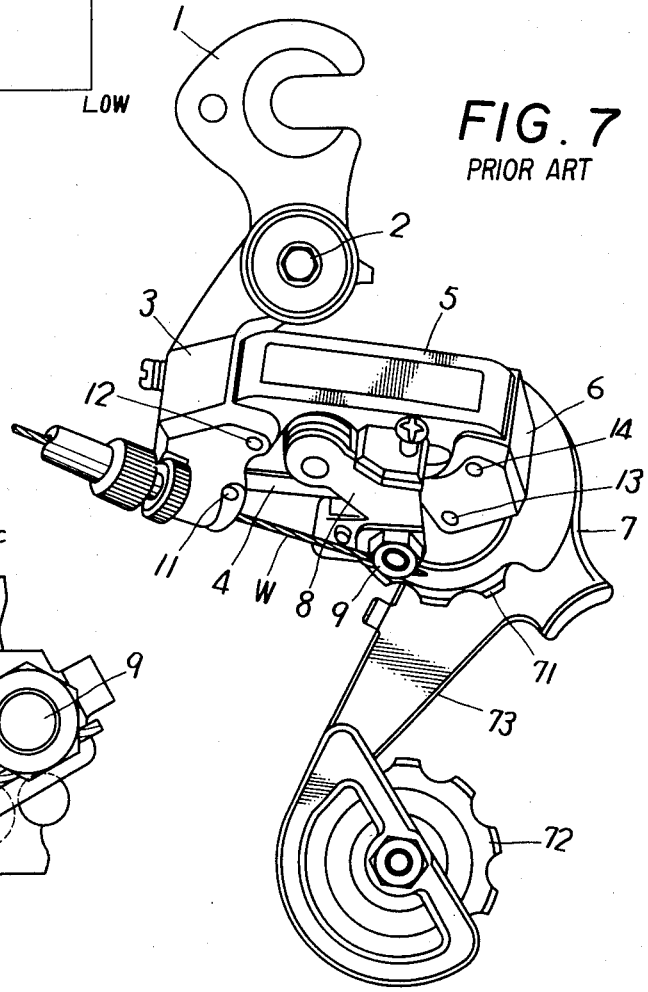

DERAILLEUR FOR A BICYCLE

FIELD OF THE INVENTION

This invention relates to a derailleur for a bicycle, and more particularly to a derailleur which is provided with a linkage mechanism comprising a base member, two linkage members and a movable member carrying a chain guide; an operating means for forwardly moving the movable member with respect to the base member; and a return spring for biasing the movable member in the direction of backward movement relative to the base member, whereby the operating means, which primarily comprises a control wire, is pulled to move the movable member forwardly against the return spring and axially of a multistage sprocket assembly with respect to the base member and the operating means is loosened to move the movable member backwardly by means of a restoring force of the return spring, thereby changing the bicycle speed.

DESCRIPTION OF THE PRIOR ART

Generally, the above type of derailleur employs a return spring which has an intermediate coiled portion and has first and second spring ends or legs extending tangentially outwardly from both ends of the coiled. The coiled portion of the spring is supported around a pivot shaft for connecting one linkage member to the base member or the movable member. The first spring leg abuts against the base member or the movable member and the second spring leg is twisted at a predetermined setting angle in the direction of contracting the diameter of the coiled portion, thereby pre-deflecting the spring as a whole, such that it elastically contacts with the linkage member.

The movable member, after moving forwardly axially of the multistage sprocket assembly by operation of the control wire, is restored by a restoring force FZ which is represented by the following equation:

$$FZ = k \times \beta \frac{d\beta}{dZ},$$

where
- k is the spring constant,
- $\beta$ is an angle of torsion, and
- Z is a stroke of the movable member in the axial direction of the multistage sprocket assembly.

In the conventional derailleur constructed as described above, since the second spring leg is twisted at an angle larger than the setting angle as the forward stroke of the movable member increases, the angle of torsion $\beta$ caused by movement of the movable member in the direction of its stroke gradually increases the same as an angle of swing of the linkage member, so that a variation in the angle of torsion of the spring increases with respect to a variation in stroke. Hence, the more the forward stroke of the movable member increases, the larger the restoring force FZ of the movable member becomes, resulting in a condition such that when the spring is deflected to change the speed by forwardly moving the movable member, i.e., when the speed is changed to the low gear side, the operating force of the operating lever becomes too large at the low gear side, thereby providing an inconvenient and uncomfortable mechanism for changing the bicycle speed.

SUMMARY OF THE INVENTION

An object of the invention is to provide a derailleur for a bicycle, wherein when a control wire is pulled to deform a linkage mechanism against the bias applied by a return spring and to move a movable member, and in turn a chain guide carried thereby in a forward direction with respect to a base member, a ratio of variation in an angle of torsion of the spring is reduced with respect to a variation in a forward stroke of the movable member, thereby averaging an operating force acting on an operating lever for changing the bicycle speed and enabling a cyclist to experience a more comfortable operation of the lever to change the bicycle speed.

In detail, the present invention is characterized in that a bicycle derailleur is provided with a linkage mechanism comprising a base member, a movable member carrying a chain guide and movable in reciprocation with respect to the base member, and first and second linkage members supporting the movable member movably in reciprocation with respect to the base member; an operating means to allow the movable member to move forwardly with respect to the base member; a return spring for biasing the movable member in the direction of backward movement relative to the base member; and, a control means which reduces the variation in a biasing force of the return spring at the starting position and the terminal position of forward movement of the movable member. The control means is provided with a swingable member pivoted to one of two opposite members of the linkage mechanism, e.g., the first and second linkage numbers, and a support shaft provided at the other of said two opposite members and supporting the return spring. The return spring has a coiled portion supported around the support shaft and first and second spring legs. The first spring leg is retained to the swingable member, and the second spring leg to the other of the two opposite members at which the support shaft is provided. According to this construction, the variation in the angle of torsion of the spring is reduced with respect to the variation in the stroke from the starting position to the terminal position of the forward movement of the movable member.

In the present invention, in a case where the operating means comprising the control wire is pulled to deform the linkage mechanism to move the movable member forwardly from the starting position of forward movement (essentially the low gear position) to the terminal position (essentially the top gear position) in order to change the gear speed, the first leg of the return spring is retained to the swingable member pivoted to the aforesaid one linkage member or to the movable member at the linkage mechanism, with the swingable member swinging at an angle of swing different from that of the linkage member as the linkage mechanism is deformed. As a result a ratio of variation in the angle of torsion of the spring with respect to a variation in the stroke of the movable member can be reduced. In other words, a variation in the angle of torsion of the spring at the low gear side becomes smaller with respect to the same at the top gear side, thereby eliminating variations in the operating force of the operating lever to allow the cyclist to experience a more comfortable operation of the speed change lever.

In the present invention, the swingable member is pivoted to a member other than the base member, operating following deformation of the linkage mechanism.

Preferably, the swingable member is pivoted to the first or the second linkage member.

Also, the support shaft for pivotally supporting the coiled portion of the spring may use one of the pivot shafts for pivotally connecting the four members constituting the linkage mechanism, but the support shaft, when the swingable member is pivoted to one of the first and second linkage members, is preferably provided at the other of the first and second linkage members.

In either case, the present invention can reduce the ratio of variation in the angle of torsion of the spring with respect to that in the stroke of the movable member from the top gear side thereof to the low gear side. In other words, a variation in the angle of torsion at the low gear side can be reduced with respect to that at the top gear side.

Accordingly, it is possible that the operating force of the operating lever, which deflects the spring to change the bicycle speed to the low gear side, can be reduced such that it is approximately equal to the operating force at the top gear side, so that the speed change can be performed with a light touch using a small force, thereby remarkably improving the operation efficiency in comparison with the conventional derailleur.

The above and further objects and novel features of the invention will be more fully apparent from the following detailed description when read in connection with the accompanying drawings.

BRIEF DESCRIPTION OF THE DRAWINGS

FIG. 4 is a graph explanatory of a restoring force with respect to the forward movement stroke of a movable member, FIG. 5 is a bottom view of the principal portion of the FIG. 1 embodiment, FIG. 6 is an illustration of the relationship between a swingable member and a return spring, and FIG. 7 is a front view illustrating a conventional derailleur as a whole.

DETAILED DESCRIPTION OF THE INVENTION

Figure 1:
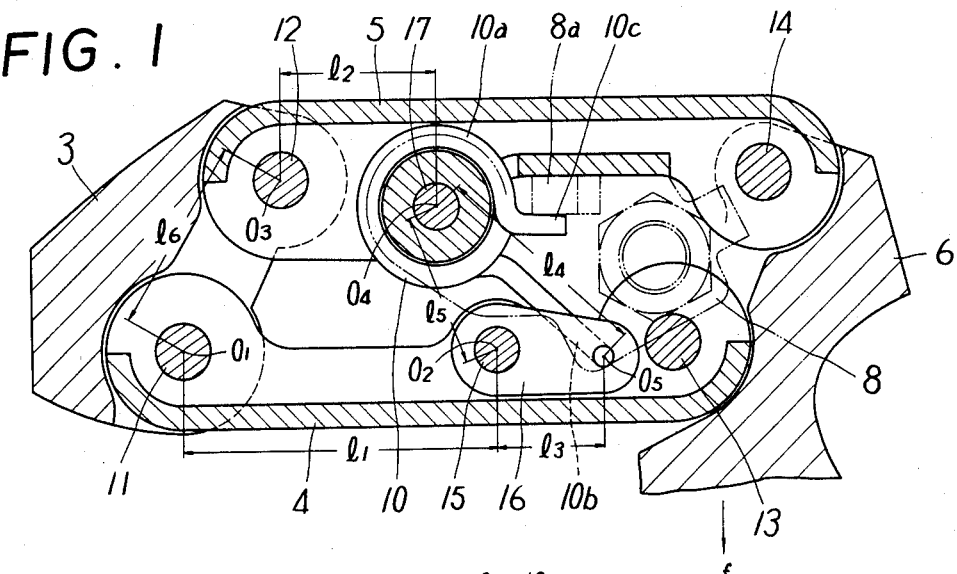
FIG. 1 is an enlarged sectional view of the principal portion of an embodiment of a derailleur of the invention.

A rear derailleur mounted on a seat stay for supporting a rear wheel hub of a bicycle is shown in FIG. 7. The derailleur is provided with a linkage mechanism A comprising a base member 3 supported through a horizontal shaft 2 to a bracket member 1 to be mounted on the seat stay, a pair of first and second linkage members 4 and 5, and a movable member 6 having a chain guide 7. Second linkage member 5 supports an operating member 8, so that a control wire W fixed thereto through a fixture 9 is pulled to move the movable member 6 forwardly axially of a multistage sprocket assembly against a return spring 10 and the wire W is loosened to return the movable member 6 by means of a restoring force of the spring 10.

The base member 3 is provided at one side with a pair of mounting portions to which the linkage members 4 and 5 are pivoted through first and second pivot shafts 11 and 12 respectively. Movable member 6 is pivoted on the free ends of linkage members 4 and 5 through third and fourth pivot shafts 13 and 14 respectively.

The chain guide 7 comprises a guide pulley 71, a tension pulley 72, and a chain-shifting frame 73 supporting rotatably both the pulleys, chain-shifting frame 73 is pivoted to the movable member 6 through a horizontal shaft.

Referring to FIG. 1, an embodiment of a derailleur of the invention is shown in its principal portion, in which a swingable member 16 is pivoted through a pivot pin 15 to the first linkage member 4 of the four members constituting the linkage mechanism A. Return spring 10 has a coiled intermediate portion 10a and extends at both ends radially of the coiled portion 10a to form first and second spring ends or legs 10b and 10c. Spring 10 is supported at the coiled portion 10a around a support shaft 17 for the operating member 8 and is retained at the first spring leg 10b to the swingable member 16 and makes elastic contact at the second spring leg 10c with a stopper 8a at the operating member 8. Hence, when the control wire W is pulled to forwardly move the movable member 6, i.e., when the first and second linkage members 4 and 5 swing in the direction of the arrow f in FIG. 1, the first spring leg 10b stretches to allow the swingable member 16 to swing so that a ratio $\beta_n/\beta_1$, where $\beta_n$ is an angle of torsion of the spring 10 at the low gear side and $\beta_1$ is an angle of torsion of spring 10 at the top gear side corresponding to a ratio $\theta_n/\theta_1$ of an angle of swing $\theta_n$ of each linkage member 4 or 5 at the low gear side to an angle of swing $\theta_1$ of each linkage member 4 or 5 at the top gear side is reduced. In other words, variation in the angle of torsion of the spring 10 at the low gear side is reduced with respect to the same at the top gear side.

Figure 3:
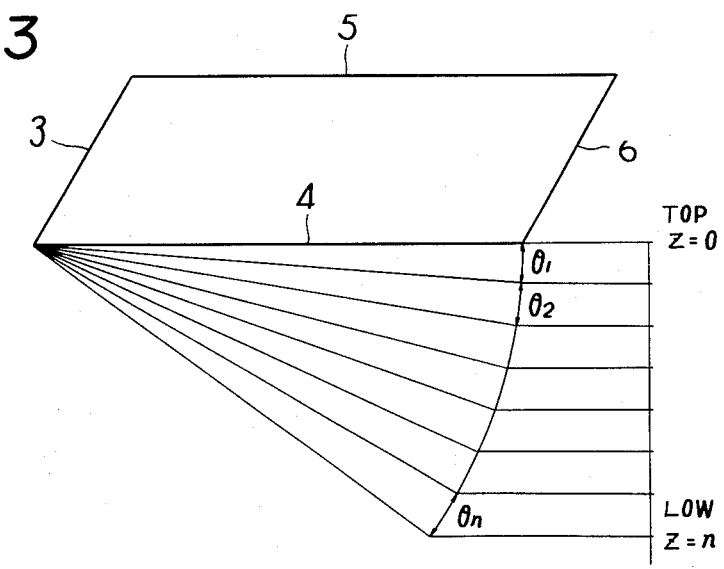

In the aforesaid construction, each angle of swing of the linkage member 4 or 5, as shown in FIG. 3, corresponds to each length obtained by dividing the maximum allowable stroke of the movable member 6 into N-equal parts.

Also, the swingable member 16 is smaller in length than the first linkage member 4, and is disposed inside the first linkage member 4 which has a U-shaped cross-section, as shown in FIG. 1. Swingable member 16 is pivoted at one lengthwise end to an intermediate portion of the first linkage member 4 through a pivot pin 15 extending in parallel to the pivot shafts 11 and 12, and is oriented at the other lengthwise end toward the movable member. Also, the return spring 10 is disposed inside the second linkage member 5 which also has a U-shaped cross-section and is supported at the coiled portion 10a rotatably to an intermediate portion of second linkage member 5 through a support shaft 17 extending in parallel to the pivot shafts 11 and 12. Return spring 10 is retained at the first spring leg 10b to the other end of the swingable member 16.

Also, the swingable member 16 is pivoted to the position where a distance $l_1$ between the axis $O_1$ of the first pivot shaft 11 for pivoting the first linkage member 4 to the base member 3 and the axis $O_2$ of the pivot pin 15 for pivoting the swingable member 16 to the first linkage member 4 and distance $l_2$ between the axis $O_3$ of second pivot shaft 12 for pivoting the second linkage member 5 to the base member 3 and axis $O_4$ of the support shaft 17 for supporting the return spring 10, have a relationship of $l_1 > l_2$. In this case, the relation between an effective length $l_3$ of the swingable member 16 and the length $l_4$ between the support position $O_4$ at the second linkage member 5 for the spring 10 and the retaining position $O_5$ at the swingable member 16 for the spring 10, is not particularly limited, but may be $l_3 > l_4$, $l_3 < l_4$ or $l_3 = l_4$. If a distance $l_5$ between $O_2$ and $O_4$ is remarkably larger than distance $l_6$ between the pivot shafts 11 and 12, it is preferable to make $l_3$ larger than $l_4$. Alternatively, the swingable member 16 may be pivoted at the position of $l_1=l_2$. In this case, the distance $l_5$ and $l_6$ may to have a relation of $l_5>l_6$ or $l_5<l_6$.

In the derailleur shown in the drawings, the operating member 8 is swingably supported to the second linkage member 5 and return spring 10 functions to restore the movable member 6 by a restoring force arising from deflecting of the spring 10. Return spring 10 also functions as a saver spring such that, even when a resistance against speed change by pulling the control wire when the chain is not being driven is larger than that when the chain is being driven, the control wire W can be operated to conserve the operating force thereof. Hence, the operating member 8 is operated in association with the second linkage member 5 for the usual resistance against the speed change. When the resistance against the speed change is larger than the usual resistance, the operating member 8 is moved in swinging motion against the return spring 10 with respect to the second linkage member 5, thereby being switched to a desired speed change stage. When the aforesaid larger resistance is released to start the drive of the chain, the restoring force of return spring 10 operates the second linkage member 5 and the movable member 6 is moved toward the speed change stage previously switched by operating the control wire.

The derailleur shown in FIG. 7 is so constructed that the first and second pivot shafts 11 and 12 for connecting the linkage members 4 and 5 to the base member 3, and the third and fourth pivot shafts 13 and 14 for pivoting the movable member 6 to free ends of the linkage members 4 and 5, are inclined with respect to the plane perpendicular to the axis of the multistage sprocket assembly. As a result, movable member 6, during the speed change operation, is moved in parallel to the axis of the multistage sprocket assembly and simultaneously is moved radially thereof in the plane perpendicular to the aforesaid axis.

Explanation will now be given regarding operation of the derailleur constructed as described above in accordance with FIGS. 2 and 3 which illustrate the principles of operation thereof.

When the operating lever is operated to pull the control wire W, the first and second linkage members 4 and 5, as shown in FIG. 3, each swing at an angle of swing $\theta_1, \theta_2 \ldots$ or $\theta_n$ with respect to a length resulting from dividing into n equal parts the whole stroke from the starting position (Z=0) to the terminal position (Z=n) of the forward movement of movable member 6. The angle of swing is smaller at the top gear side and larger at the low gear side. On the other hand, the swingable member 16 swings through the first spring leg 10b as the first and second linkage members 4 and 5 swing. In this case, since the support shaft 17 also shifts following the swinging motion of first and second linkage members 4 and 5, there are two factors for variation. Hence, to facilitate explanation, it is assumed that the second linkage member 5 is fixed and the first linkage member 4 operates through the base member 3 and movable member 6. In other words, when the linkage members 4 and 5 swing, and when the base member 3 and movable member 6 swing with respect to the first or the second linkage member 4 or 5, the swingable member 16 moves similarly in principle, whereby FIG. 2 shows the relation between the angle of swing of the swingable member 16 and the angle of torsion of the return spring 10 in a case where the second linkage member 5 is fixed and the base member 3 and movable member 6 swing and the first linkage member 4 is moved rightwardly in FIG. 2.

Figure 2:
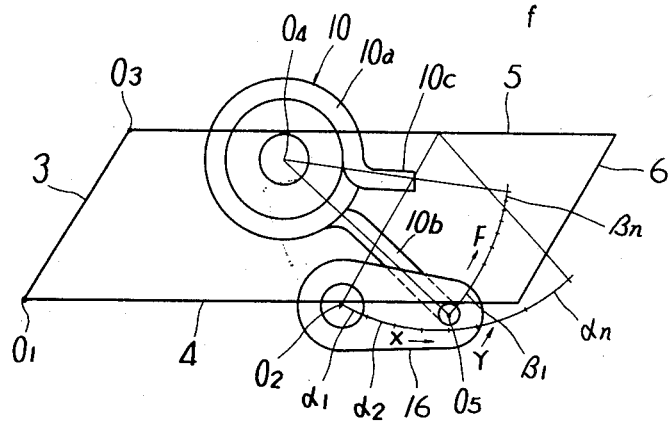
FIGS. 2 and 3 are views illustrating the principle of the invention.

In FIG. 2, when the base member 3 and movable member 6 swing counterclockwise (in the direction of the arrow X), the first linkage member 4 moves rightwardly in FIG. 2 so that the pivot position $O_2$ of swingable member 16, together with the first linkage member 4, describes the locus shown in FIG. 2 to shift in the direction of the arrow X by the angles of $\alpha_1$ through $\alpha_n$ corresponding to the angles of swing $\theta_1$ through $\theta_n$. In this case, there is a relation of $\theta_i = \alpha_i$ where $i=1, 2 \ldots n$. Also, the swingable member 16 is subjected to the stretching action of the first spring leg 10b and swings counterclockwise (in the direction of the arrow y) in FIG. 2, whereby the first spring leg 10b shifts in the direction of the arrow F to deflect the spring 10. As a result, the return spring 10 deflects at the angles of torsion $\beta_1$ through $\beta_n$ in the direction of the arrow F in FIG. 2 corresponding to the angles of swing $\alpha_1$ through $\alpha_n$.

In a case where the whole stroke from the starting position to the terminal position of the forward movement of the moving member 6 is divided into equal parts, the respective angles of swing $\theta_1$ through $\theta_n$ of the first linkage member 4 with respect to the length of each divided stroke of the movable member 6 become larger gradually from the top gear side to the low gear side.

Accordingly, the angles of displacement $\alpha_1$ through $\alpha_n$ of the pivot position $O_2$ of the swingable member 16 corresponding to the angles of swing $\theta_1$ through $\theta_n$ of the first linkage member 4 become gradually larger.

However, the angles of displacement of the first leg 10b, and in turn the angles of torsion $\beta_1$ through $\beta_n$ of the spring 10, corresponding to displacement of the pivot position $O_2$ become about equal to each other without corresponding to the angles of displacement $\alpha_1$ through $\alpha_n$.

In brief, a ratio $\beta_n/\beta_1$ of the angle of torsion $\beta_n$ at the low gear side of the spring 10 to that $\beta_1$ at the top gear side, i.e., a variation in the angle of torsion at the low gear side is smaller than the same at the top gear side. Hence, the ratio of variation in the angle of torsion $\beta$ of the spring 10 to the stroke Z of the movable member 6 from the top gear side to the low gear side reduces, so that when the movable member 6 moves toward the low gear side, the restoring force FZ of the movable member 6 by the spring 10, which is intended to return to the top gear side, is given in the equation:

$$FZ = k \times \frac{d\beta}{dZ},$$

thereby being smaller at the low gear side as shown by the solid line than the conventional example as shown in the broken line in FIG. 4. As a result, the operating force of the operating lever for changing the speed to the low gear side by deflecting the return spring 10 is not excessive at the low gear side, thereby enabling the operating lever to be operated by an operating force approximately equal to that required for the top gear side.

Alternatively, in the aforesaid embodiment, the swingable member 16 may be supported to the second linkage member 5 and the support shaft 17 for the return spring 10 be provided at the first linkage member 4. Also, the support shaft 17 may utilize one of the first through fourth pivot shafts 11 through 14 for connecting the linkage members 4 and 5 with the base member 3 or the movable member 6.

Also, the swingable member 16 may alternatively be pivoted to one of the base member 3 and movable member 6, and the return spring 10 may be interposed between the other of base member 3 and movable member 6 and the swingable member 16.

Furthermore, besides the rear derailleur in FIG. 7, a front derailleur can similarly be constructed in accordance with the present invention.

While a preferred embodiment of the invention has been described using specific terms, such description is for illustrative purpose only, and it is to be understood that changes and variations may be made without departing from the spirit or scope of the following claims.

What is claimed is:

1. A bicycle derailleur, comprising:
a linkage mechanism comprising a base member, a movable member, and first and second linkage members supporting said movable member to said base member, such that said movable member is reciprocably movable relative to said base member;
an operating means for moving said movable member in a first direction with respect to said base member;
a return spring for biasing said movable member in a second direction opposite to said first direction with respect to said base member; and
a control means for reducing a variation in a biasing force of said return spring at a starting position and a terminal position of movement of said movable member in said first direction, said control means comprising a swingable member pivoted to one member of said linkage mechanism and a support shaft disposed at another member of said linkage members which is opposite to said one member, said spring having a coiled portion supported to said support shaft and first and second spring legs extending from both ends of said coiled portion, said first spring leg being retained to said swingable member, said second spring leg being retained to said another member, whereby a variation in a torsion angle of said spring is reduced with respect to a variation in a movement stroke from said starting position to said terminal position of said movable member in said first direction.

2. A bicycle derailleur according to claim 1, wherein said linkage mechanism comprises first and second pivot shafts for pivoting said first and second linkage members to said base member and third and fourth pivot shafts for pivoting said movable member to said first and second linkage members, said swingable member being pivoted to said first linkage member at a position between said first and third pivot shafts.

3. A bicycle derailleur according to claim 2, wherein said support shaft is pivoted to said second linkage member at a position between said second and fourth pivot shafts.

4. A bicycle derailleur according to claim 3, wherein a distance between a pivotal center of said swingable member and an axis of said first pivot shaft for pivoting said first linkage member to said base member is larger than a distance between an axis of said support shaft and an axis of said second pivot shaft for pivoting said second linkage member to said base member.

5. A bicycle derailleur according to claim 1, wherein said another member opposite to said one member pivotally supporting said swingable member comprises a saver arm so that said second spring leg is retained to said saver arm.

6. A bicycle derailleur according to claim 5, wherein said saver arm is supported swingably to said support shaft.

* * * * *